May 11, 1954   R. J. IFIELD   2,678,057
LIQUID FUEL REGULATING MEANS FOR USE WITH PRIME MOVERS
Filed Jan. 8, 1952   2 Sheets-Sheet 1

Inventor
R. J. Ifield

May 11, 1954 R. J. IFIELD 2,678,057
LIQUID FUEL REGULATING MEANS FOR USE WITH PRIME MOVERS
Filed Jan. 8, 1952 2 Sheets-Sheet 2

Inventor
R. J. Ifield

Patented May 11, 1954

2,678,057

UNITED STATES PATENT OFFICE 2,678,057

LIQUID FUEL REGULATING MEANS FOR USE WITH PRIME MOVERS

Richard Joseph Ifield, Dural, New South Wales, Australia, assignor to Joseph Lucas Limited, Birmingham, England Application January 8, 1952, Serial No. 265,453

Claims priority, application Great Britain January 18, 1951

4 Claims. (Cl. 137—95)

In various forms of liquid fuel regulating means for jet engines, gas turbines or other prime movers, a device is employed for setting up a pressure difference in the fuel supply system at a position between the fuel supply pump and the burner in a combustion chamber, this pressure difference being utilised to control the pump output, or otherwise vary the rate of fuel supply to the burner.

In the specification of my application for British Patent No. 21,714 of 1949, I have described a means for enabling a pressure difference to be set up and utilised for the purpose above mentioned. The said means comprises an apparatus having in combination, a chamber which is divided into two compartments by a diaphragm, a conduit adapted to be connected in series with the fuel supply system and having therein a restricted orifice adapted to set up a pressure difference in the liquid flowing therethrough, a passage containing a second restricted orifice leading from the entrance side of the first orifice to one of the said compartments, an unrestricted passage leading from another part of the conduit to the other compartment, a valve seating in the first-mentioned compartment, a closure member carried by the diaphragm and co-operating with the said seating, a passage leading from the said seating to a discharge flow exit and containing a third restricted orifice, and a further passage extending from a position between the said seating and the last mentioned orifice, which passage is intended to convey the fluid required for actuating or controlling the fuel regulating means.

In the further development of the said invention, it has been found desirable under some conditions to be able to vary proportionately the resistance to flow of liquid fuel through the two first mentioned restricted orifices (hereinafter referred to as ports) in response to a pressure which is the difference of the pressure of the incoming liquid fuel and that of the fuel supplied to the burner, and the object of the present invention is to enable this requirement to be met in a convenient manner.

The invention comprises a hollow body part having a fuel inlet, a port or ports leading from the inlet to an outlet, another port or ports leading from the inlet to a branch passage, and a member movable in response to the difference of fuel pressure at the inlet and outlet for proportionately varying the resistance to flow of liquid fuel through the ports.

Figure 1:
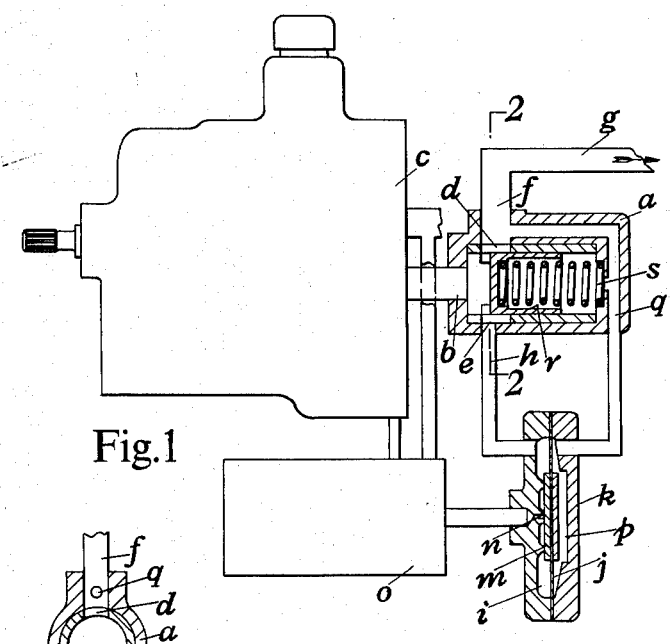
Figure 1 is a part sectional view illustrating one means for carrying the invention into effect.
Figure 2:
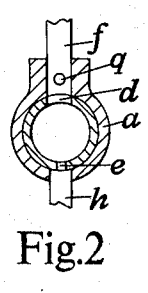
Figure 2 is a cross section on the line 2—2 Figure 1.

Referring to Figures 1 and 2 there is provided a body part $a$ having therein a cylindrical bore. The inlet $b$ to the bore is intended for connection to a pipe along which liquid fuel is supplied by the fuel pump $c$. In the said bore are formed a pair of ports $d$, $e$ which may be of different widths and of any convenient length. The ports $d$, $e$ provide the two required restricted orifices leading respectively to an outlet $f$ to which is connected a pipe $g$ leading to the burner, and to a branch passage $h$, the port $d$ being made of appropriately larger size than the port $e$.

The passage $h$ leads to a compartment $i$ at one side of a diaphragm $j$ in a chambered part $k$ and the diaphragm carries a closure member $m$ which controls an orifice $n$ leading to a control unit $o$. The other compartment $p$ at the opposite side of the diaphragm communicates with the port $d$ by way of a passage $q$ which also opens into one end of the bore in the body part $a$. In the said bore is contained a piston valve $r$ which is loaded at its rear side by a spring $s$, and the forward end of this valve is adapted to control and consequently vary jointly and proportionately the effective areas of the ports $d$, $e$ in response to the pressure difference which exists between the inlet $b$ and the exit side of the port $d$. With variation of this pressure difference, there results a corresponding movement of the piston valve, causing the effective areas of the two ports $d$, $e$ to be jointly varied in the desired manner.

The unit $o$ serves (in the example shown) to control the output of the pump $c$, but it may be used to control the rate of supply of fuel to the burner in any other convenient manner as described in our previous specification above mentioned.

Figure 3:
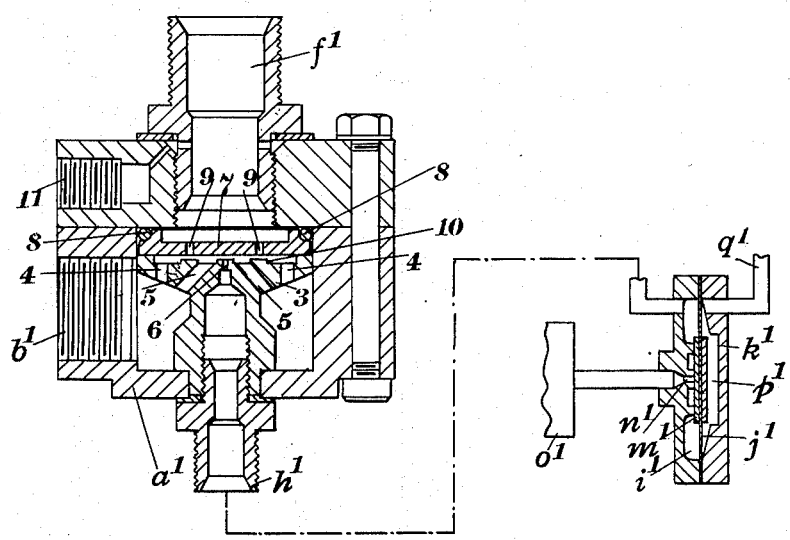
Figure 3 is a sectional side elevation illustrating another means for carrying the invention into effect.

Referring to Figure 3, a body part $a^1$ has formed in it a cylindrical chamber having at one side a fuel inlet $b^1$, and having at one end an outlet $f^1$ through which the fuel can flow to the burner. At the other end of the said chamber and coaxially with the outlet to the burner is provided a branch outlet $h^1$. The entrance to the branch outlet is formed by a mushroom-like fitting 3 contained in the said chamber. The head of the fitting forms a partition between the inlet $b^1$ and outlet $f^1$ and has formed in it two rings of apertures 4, 5 through which the liquid can flow. Also at the centre of the head is formed a restricted orifice 6 through which the fuel can enter the branch passage.

Between the head of the said fitting and the entrance to the outlet $f^1$ is arranged a control member in the form of a disc 7 which is loaded by a resilient member. The member may conveniently consist of a rubber or like resilient ring 8 which serves also as a seal. In the said member is formed a ring of apertures 9 through which the fuel can pass to the outlet $f^1$. Also on the head of the fitting 3 is formed an annular land 10 situated between the apertures 4, 5 which land controls the flow through the apertures 9. Also the body part is provided with a pipe connection 11 leading to the outlet $f^1$. The passages $h^1$ and 11 are intended to be connected to the two compartments of a body part as $k^1$ (as $k$ in Figure 1) associated with the fuel control unit.

The arrangement is such that the fuel entering at $b^1$ passes through the apertures 4, 5 and thence through the apertures 9 and the restricted orifice 6 to the outlet $f^1$ and branch $h^1$ respectively. The resistance to flow to the outlet $f^1$ and branch is varied by the position of the control disc 7 relatively to the land 10 and the entrance to the orifice 6, this disc being movable in response to the difference of fuel pressures at the inlet $b^1$ and outlet $f^1$, movement of the disc causing the resistance to flow through the apertures 9 and the branch orifice 6 to be varied proportionately.

By either of the devices above described the desired proportionality of the resistance to flow in the ports above mentioned can be obtained in a simple and convenient manner.

Having thus described my invention what I claim as new and desire to secure by Letters Patent is:

1. Fuel regulating means for an internal combustion prime mover comprising, in combination, liquid pressure responsive means for varying the rate of supply of liquid fuel to the burner of a prime mover and including a pressure responsive member, a hollow body part having an inlet for liquid fuel, port means formed in said body part affording at all times a restricted orifice leading from said inlet to an outlet adapted to be connected to the burner, a second port means affording at all times a restricted orifice leading from said inlet to a branch passage communicating with one side of said pressure responsive member, means affording an unrestricted passage between the exit side of said first restricted orifice and the other side of said pressure responsive member, a member movable in the body part and arranged to thereby vary simultaneously the respective areas of the first and second port means, and means enabling the inlet and outlet pressures to act in opposition upon a part associated with said movable member whereby as a result of the consequent movement of said member the respective resistances to flow through the said port means and hence the relative rates of flow of fuel to the liquid pressure responsive means and to the burner can be jointly and proportionately varied.

2. Fuel regulating means according to claim 1, in which the body part has a bore in which the first and second port means are formed, and the movable member comprises a spring-loaded piston valve slidable in the bore, one side of said piston valve being exposed to the inlet pressure, and passage means is provided for communicating the outlet pressure to the other side of the piston valve.

3. Fuel regulating means for an internal combustion prime mover comprising, in combination, liquid pressure responsive means for varying the rate of supply of liquid fuel to the burner of the prime mover, a valve for controlling said liquid pressure responsive means, a pressure responsive member in a chamber containing said valve for actuating the latter and dividing the chamber into two parts, a hollow body part having an inlet for liquid fuel, port means formed in said body part affording a restricted orifice leading from said inlet to an outlet adapted to be connected to the burner, a second port means affording a restricted orifice leading from said inlet to a branch passage communicating with one side of said pressure responsive member, a member movable in the body part and arranged to thereby vary simultaneously the respective areas of the first and second port means, one side of said member being exposed to the inlet pressure, and passage means affording communication between the outlet and the other side of said movable member and also between the outlet and the other side of the pressure responsive member in the aforesaid chamber, whereby the respective resistances to flow through the said port means and hence the relative rates of flow of fuel to the liquid pressure responsive means and to the burner can be jointly and proportionately varied.

4. Fuel regulating means for an internal combustion prime mover comprising, in combination, liquid pressure responsive means for varying the rate of supply of liquid fuel to the burner of the prime mover, a hollow body part having an inlet and an outlet for liquid fuel, the outlet being adapted to be connected to the burner of the prime mover, a branch passage coaxial with said outlet and leading to said pressure responsive means, a stationary ported member situated between the inlet and the outlet, and including port means leading to said branch passage and a resiliently-loaded apertured disc situated between said stationary member and the outlet and movable relatively to the said stationary member in response to the pressure difference between the inlet and outlet to vary simultaneously the areas of the ports leading respectively to the outlet and branch passage, whereby the respective resistances to flow through the said ports and hence the relative rates of flow of fuel to the liquid pressure responsive means and hence to the burner can be jointly and proportionately varied.

References Cited in the file of this patent

UNITED STATES PATENTS

| Number | Name | Date |
|---|---|---|
| 1,157,957 | Pfau | Oct. 26, 1915 |